(12) United States Patent
De Azevedo et al.

(10) Patent No.: US 8,844,866 B2
(45) Date of Patent: Sep. 30, 2014

(54) ASSEMBLIES FOR EXTERNAL ATTACHMENT OF AIRBORNE SENSOR PODS TO AN AIRCRAFT FUSELAGE

(71) Applicant: Embraer S.A., São José dos Campos (BR)

(72) Inventors: Romero Maia Soares De Azevedo, São José dos Campos (BR); Lafayete Faria Siqueira, São José dos Campos (BR); Sergio Cunha Montesi, São José dos Campos (BR)

(73) Assignee: Embraer S.A., São José dos Campos-SP (BR)

( * ) Notice: Subject to any disclaimer, the term of this patent is extended or adjusted under 35 U.S.C. 154(b) by 154 days.

(21) Appl. No.: 13/655,347

(22) Filed: Oct. 18, 2012

(65) Prior Publication Data
US 2014/0110526 A1    Apr. 24, 2014

(51) Int. Cl.
*B64C 1/22* (2006.01)

(52) U.S. Cl.
USPC ........................ 244/118.5; 244/137.4; 343/705

(58) Field of Classification Search
USPC ............... 244/118.1, 137.4, 1 R, 55, 54, 139, 244/129.1, 62, 53 R, 65
See application file for complete search history.

(56) References Cited

U.S. PATENT DOCUMENTS

| | | | | |
|---|---|---|---|---|
| 1,880,997 A * | 10/1932 | Stout | ................. | 244/55 |
| 2,980,909 A * | 4/1961 | Clanton, Jr. et al. | .......... | 343/705 |
| 3,045,236 A * | 7/1962 | Colman et al. | ................ | 343/705 |
| 4,509,709 A * | 4/1985 | Utton et al. | ................ | 244/118.1 |
| 4,571,936 A * | 2/1986 | Nash et al. | ........................ | 60/797 |
| 5,049,891 A * | 9/1991 | Ettinger et al. | ............... | 343/705 |
| 5,238,208 A * | 8/1993 | Davis | ......................... | 244/118.1 |
| 5,575,438 A * | 11/1996 | McGonigle et al. | ............ | 244/13 |
| 5,782,078 A * | 7/1998 | Brantley | ......................... | 60/797 |
| 5,927,648 A * | 7/1999 | Woodland | .................. | 244/118.1 |
| 5,986,611 A * | 11/1999 | Harrison et al. | .............. | 343/705 |
| 6,328,293 B1 * | 12/2001 | Olsen | ....................... | 267/140.11 |
| 6,745,981 B1 * | 6/2004 | Rainer et al. | ............... | 244/118.1 |
| 8,393,580 B2 * | 3/2013 | Droney | ....................... | 244/137.4 |
| 8,490,916 B2 * | 7/2013 | Olsen et al. | ..................... | 244/54 |
| 8,511,613 B2 * | 8/2013 | Droney | ....................... | 244/137.4 |
| 2009/0084901 A1 * | 4/2009 | Lam et al. | ................... | 244/137.4 |
| 2010/0065691 A1 * | 3/2010 | Droney | ....................... | 244/53 R |

* cited by examiner

*Primary Examiner* — Christopher P Ellis
*Assistant Examiner* — Medhat Badawi
(74) *Attorney, Agent, or Firm* — Nixon & Vanderhye P.C.

(57) ABSTRACT

Sensor pod attachment assemblies are provided for attaching a sensor pod containing airborne sensor equipment to an aircraft fuselage. The sensor pod assemblies may include fore and aft pairs of attachment pylon assemblies each having a lower end attached to the aircraft fuselage and an upper end attached to the sensor pod. The fore pair of attachment pylon assemblies can include port and starboard pylon structures, and a cross-support base connected to upper ends of the port and starboard pylon structures. The aft pair of attachment pylon assemblies may include a lengthwise adjustable spar assembly.

11 Claims, 8 Drawing Sheets

ASSEMBLIES FOR EXTERNAL ATTACHMENT OF AIRBORNE SENSOR PODS TO AN AIRCRAFT FUSELAGE

FIELD

The embodiments disclosed herein relate generally to the external attachment of sensor pods (e.g., radomes) containing airborne sensor equipment (e.g., radar antenna(s) and/or other airborne sensors) to an aircraft fuselage by a pylon attachment assembly. In especially preferred embodiments, pylon attachment assembly includes a pair of integrated forward pylon structures at a forward end of the sensor pod, and a pair of individually adjustable aft pylon structures at the rear end of the sensor pod.

BACKGROUND

The mounting of various equipment, such as airborne radar antenna and other airborne sensors, onto an aircraft fuselage has various advantages, especially for airborne intelligence, surveillance and reconnaissance (ISR) missions. For example, by virtue of the aircraft's ability to attain high altitudes, relatively large ground surface areas and/or airspace volume may be monitored by the airborne sensor equipment.

The mounting of airborne equipment onto an upper portion of an aircraft fuselage is in and of itself well known. For example, U.S. Pat. No. 6,745,981 to Rainer et al (the entire contents of which are hereby incorporated by reference herein) provides a conventional means to mount a sensor pod onto an aircraft fuselage. According to this prior proposal, the sensor pod is an elongate structure having front and rear ends positioned above the fuselage. Structural supports are provided which include a first end coupled to the fuselage of the aircraft and second end coupled to the sensor pod at the front and rear, respectively. One drawback to such a proposed sensor pod installation is that it can be limited in terms of aerodynamic requirements, aircraft drag limits, antenna radar weight, aircraft loads structural strength, and in terms of the incorporation of other radar antennas. Moreover conventional sensor pod attachments do not provide versatility in mounting of various different types of airborne sensor pods and associated sensors.

It is therefore towards providing solutions to such problems that the embodiments of the present invention are directed.

SUMMARY

The disclosed embodiments herein are directed toward a pylon assembly for supporting an airborne pod that may be adapted to contain one or more radar antennas or other airborne sensors. In general, the pylon assembly will include a pair of integrated forward pylon structures at a forward end of the sensor pod, and a pair of individually adjustable aft pylon structures at the rear end of the sensor pod.

According to some disclosed embodiments, sensor pod attachment assemblies are provided for attaching a sensor pod containing airborne sensor equipment to an aircraft fuselage. The sensor pod assemblies may comprise fore and aft pairs of attachment pylon assemblies each having a lower end attached to the aircraft fuselage and an upper end attached to the sensor pod. The fore pair of attachment pylon assemblies can include port and starboard pylon structures, and a cross-support base connected to upper ends of the port and starboard pylon structures.

Certain disclosed embodiments include port and starboard pylon structures which have elongate fore and aft upright spars having lower ends for attachment to the aircraft fuselage and upper ends connected to the cross-support base. Ribs and stringers may be provided to interconnect the fore and aft upright spars to one another.

In other embodiments, the cross-support base may port and starboard lug mounts positioned above an upper end of the port and starboard pylon structures, respectively, for attaching the sensor pod to the fore pair of attachment pylon assemblies.

Certain disclosed embodiments will include pylon assemblies which comprise a lengthwise adjustable spar assembly. For such embodiments, the spar assembly may include an elongate spar member having upper and lower ends, upper and lower attachment fittings at the upper and lower ends of the spar member, respectively, and upper and lower connector rods attached to the upper and lower attachment fittings, respectively. At least one connector rod of the upper and lower connector rods may be threadably connected to a respective one of the upper and lower attachment fittings, respectively, so that turning movement thereof responsively allows lengthwise adjustment of the spar assembly.

According to some embodiments, each of the upper and lower connector rods are threadably connected to the upper and lower attachment fittings, respectively, and could be in the form of eye-bolt rod connectors.

The lengthwise adjustable spar assembly may further include an adjustment nut threadably connected to the at least connector rod for positionally locking the at least one connector rod. If both of the upper and lower connector rods are threadably adjustable, then upper and lower adjustment nuts may be associated therewith for positionally locking the upper and lower connector rods relative to the upper and lower attachment fittings, respectively.

Pod and fuselage attachment lugs may be provided in some embodiments for respectively attaching the upper and lower connector rods to the sensor pod and aircraft fuselage, respectively. In certain forms, the fuselage attachment lug comprises a U-shaped channel member defining a coaxially aligned pair of apertures and the lower connector rod is an eye-bolt connector rod aligned with the apertures of the channel member. The assembly may thus comprise a connector pin inserted through the apertures and the connector rod to attach the connector rod to the U-shaped channel member. A pair of lateral fitting members may be connected integrally to the U-shaped channel member.

According to other embodiments, the fore and aft pairs of attachment pylons may each include forward and rearward airfoils extending forwardly and rearwardly therefrom relative to the aircraft fuselage.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

DETAILED DESCRIPTION

Many of the details, dimensions, angles and other features shown in the figures of the present patent application are merely illustrative of particular embodiments of the invention. Accordingly, other embodiments can have other details, dimensions, angles and features, without departing from the spirit or scope of the present inventions. Several embodiments of innovative structures and assemblies are described hereinbelow as solutions to the problems identified briefly above.

Figure 1:
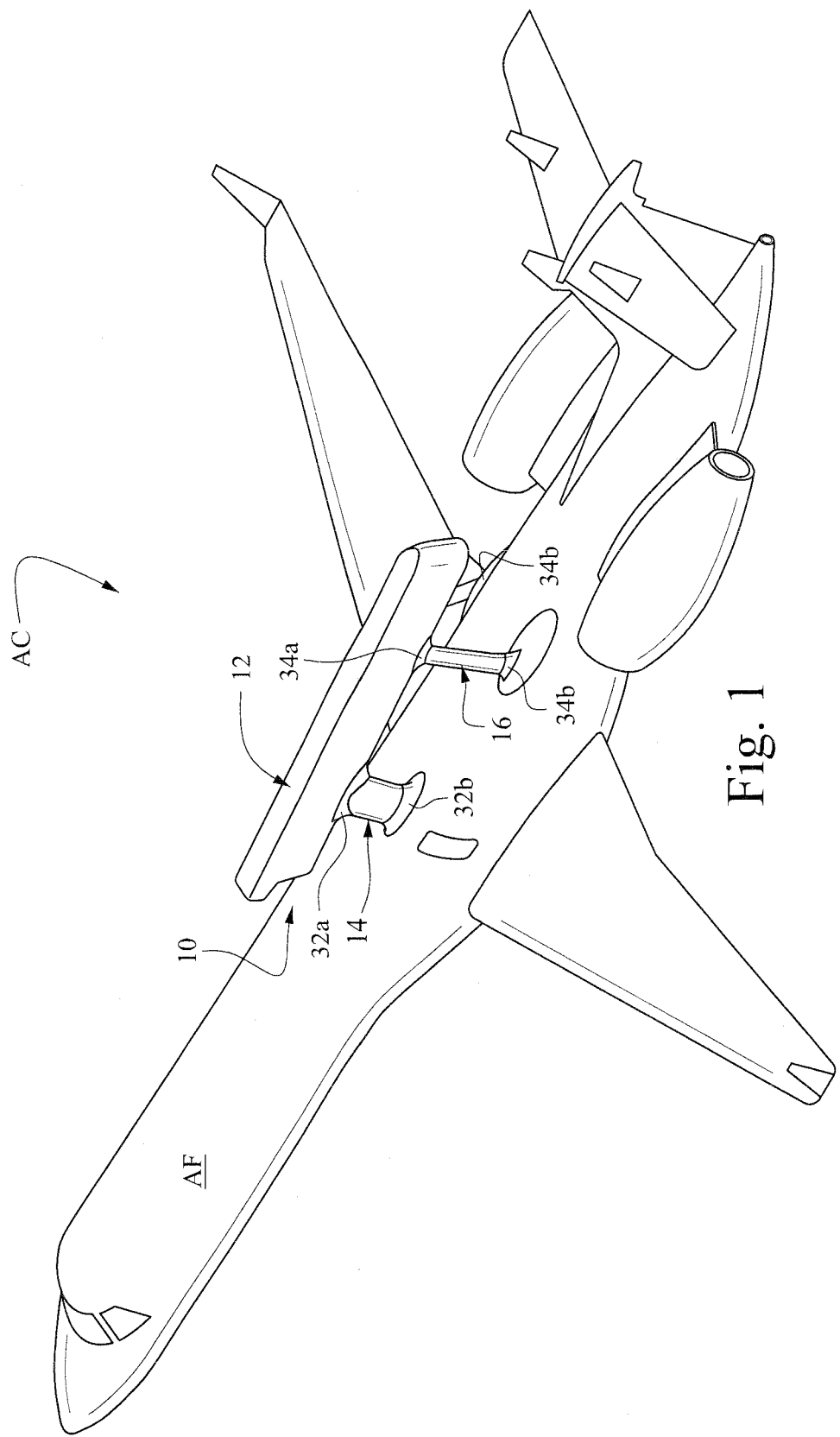
FIG. 1 is an exemplary perspective view of an aircraft showing a sensor pod mounted thereto by means of a pylon attachment assembly according to an embodiment disclosed herein.

As shown in FIG. 1, a transport aircraft AC has a fuselage AF to which a sensor pod assembly 10 is mounted to an upper region thereof in a "piggy-back" fashion. The sensor pod assembly 10 generally includes a sensor pod 12 (e.g., radome) which contains the desired airborne sensors, e.g., radar antenna(s) and/or other airborne sensors, and fore and aft pairs of pylon assemblies 14, 16, respectively. The sensor pod 12 is preferably an elongate structure housing the sensors (not shown) which is longitudinally aligned with the fuselage AF. Thus, fore and aft pylon assemblies 14, 16 provide interconnected support between the sensor pod 12 and the structural components of the aircraft fuselage AF. In such a manner, therefore, the sensor pod 12 can be carried airborne by the aircraft AC in performing the mission of the various sensors contained therein.

Figure 2:
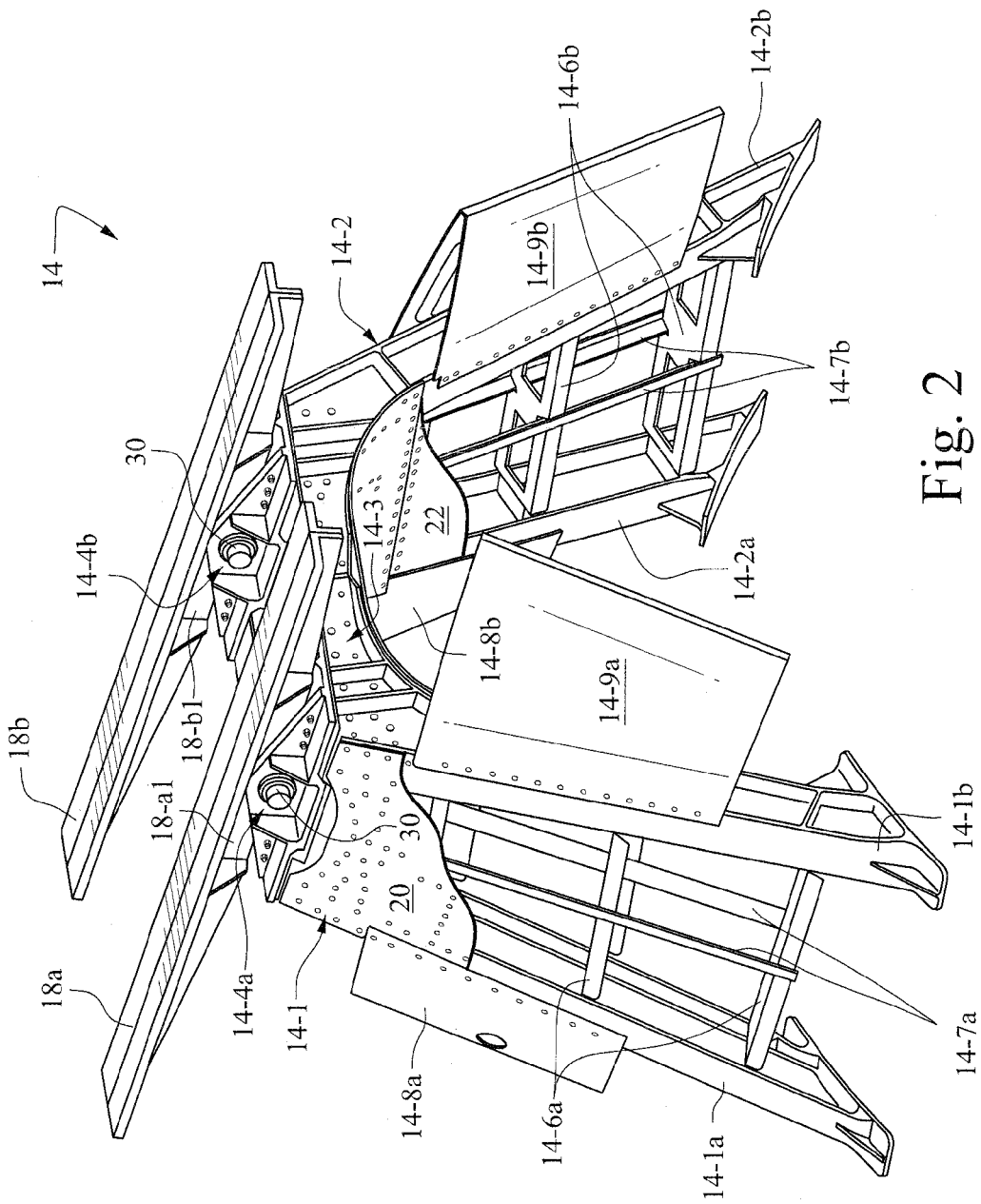
FIG. 2 is a perspective view, partly in section, of the pair of non-adjustably fixed fore pylon structures employed in the pylon attachment assembly depicted in FIG. 1.

An enlarged view of the pair of fore pylon assemblies 14 is provided by FIG. 2. The various structural components associated with the fore pylon assemblies may be fabricated from aircraft grade aluminum alloys. The fore pylon assembly 14 includes mirror image port and starboard pylon structures 14-1, 14-2, respectively, each having fore and aft upright spars 14-1a, 14-1b and 14-2a, 14-2b, respectively. The fore and aft upright spars 14-1a, 14-1b and 14-2a, 14-2b, respectively, may be machined from an aluminum alloy stock to provide a combination of an I-beam and C-beam cross-section.

A cross support base 14-3 spans the latitudinal distance between and is rigidly connected to the upper ends of the port and starboard pylon structures 14-1, 14-2, respectively. The support base 14-3 thus provides structural support to the port and starboard lug mounts 14-4a, 14-4b to which port and starboard mounting rails 18a, 18b associated with the sensor pod 12 (not shown in FIG. 2) are mounted.

Aluminum skins 20, 22 may be attached to the internal generally horizontally oriented ribs 14-6a, 14-6b and the generally vertically oriented stringers 14-7a, 14-7b, associated with the port and starboard pylon structures 14-1, 14-2, respectively, so as to cover the support structures and provide an enhanced aerodynamic profile to the overall assemblies. Similarly, enhanced aerodynamics may be provided by the fore and aft airfoils 14-8a, 14-8b and 14-9a, 14-9b, extending forwardly and rearwardly (relative to the aircraft) from the fore and aft upright spars 14-1a, 14-1b and 14-2a, 14-2b of the port and starboard pylon structures 14-1, 14-2, respectively.

Figure 3:
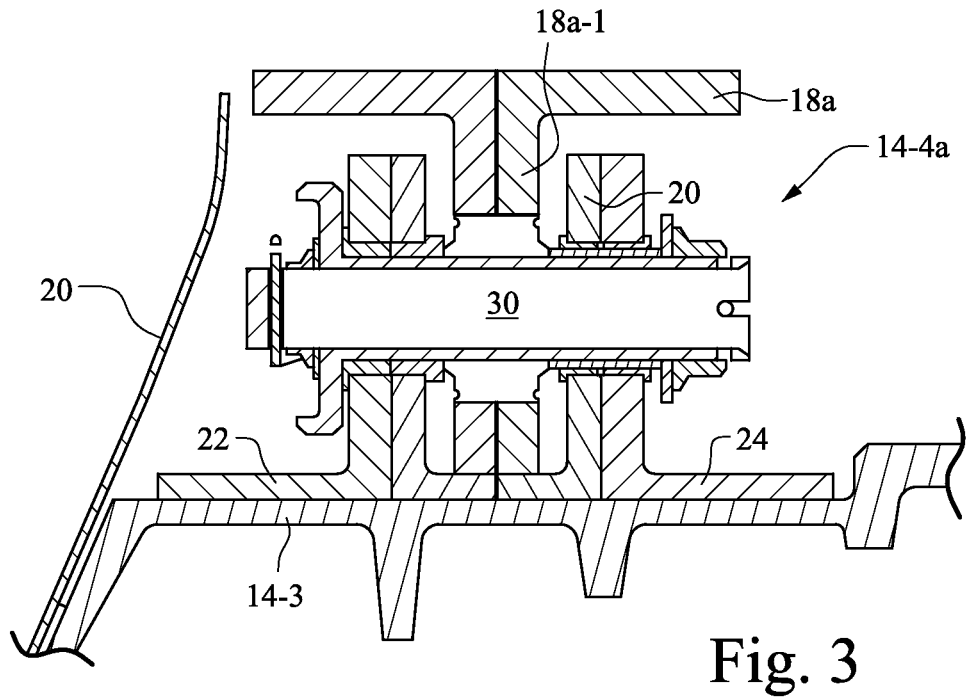
FIG. 3 is an enlarged view of an exemplary attachment pin assembly associated with the fore pylon structures.
Figure 4:
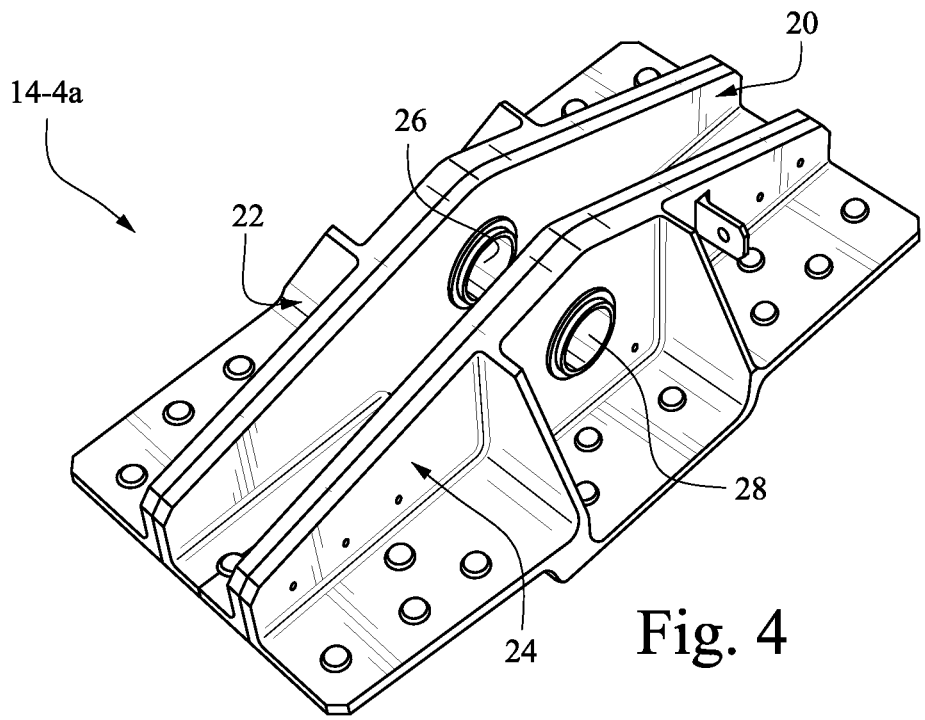
FIG. 4 is an enlarged perspective view of an upper lug associated with the attachment pin assembly depicted in FIG. 3.
Figure 5:
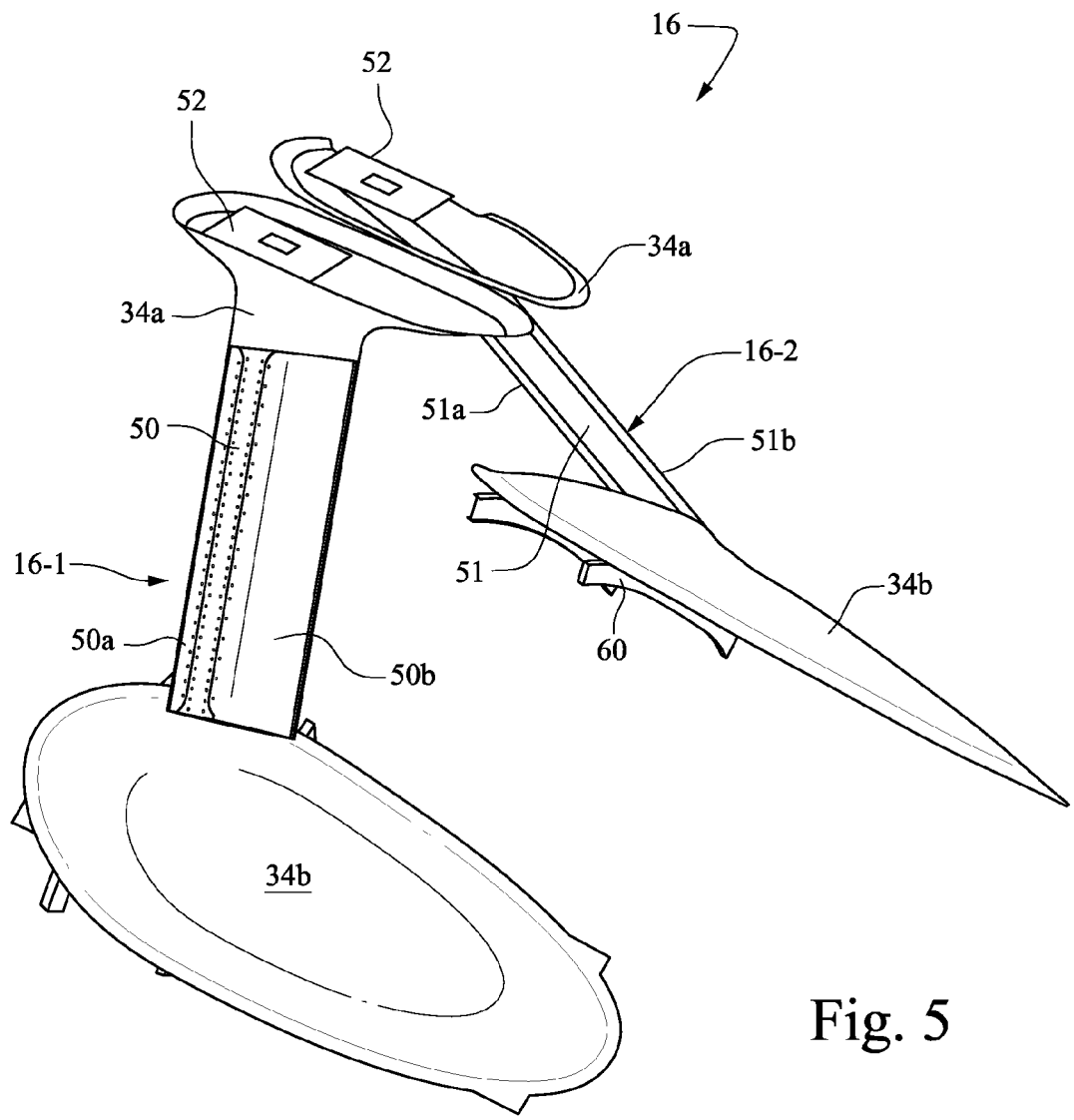
FIG. 5 is a perspective view of an exemplary pair of adjustably fixed aft pylon structures employed in the pylon attachment assembly depicted in FIG. 1.
Figure 6:
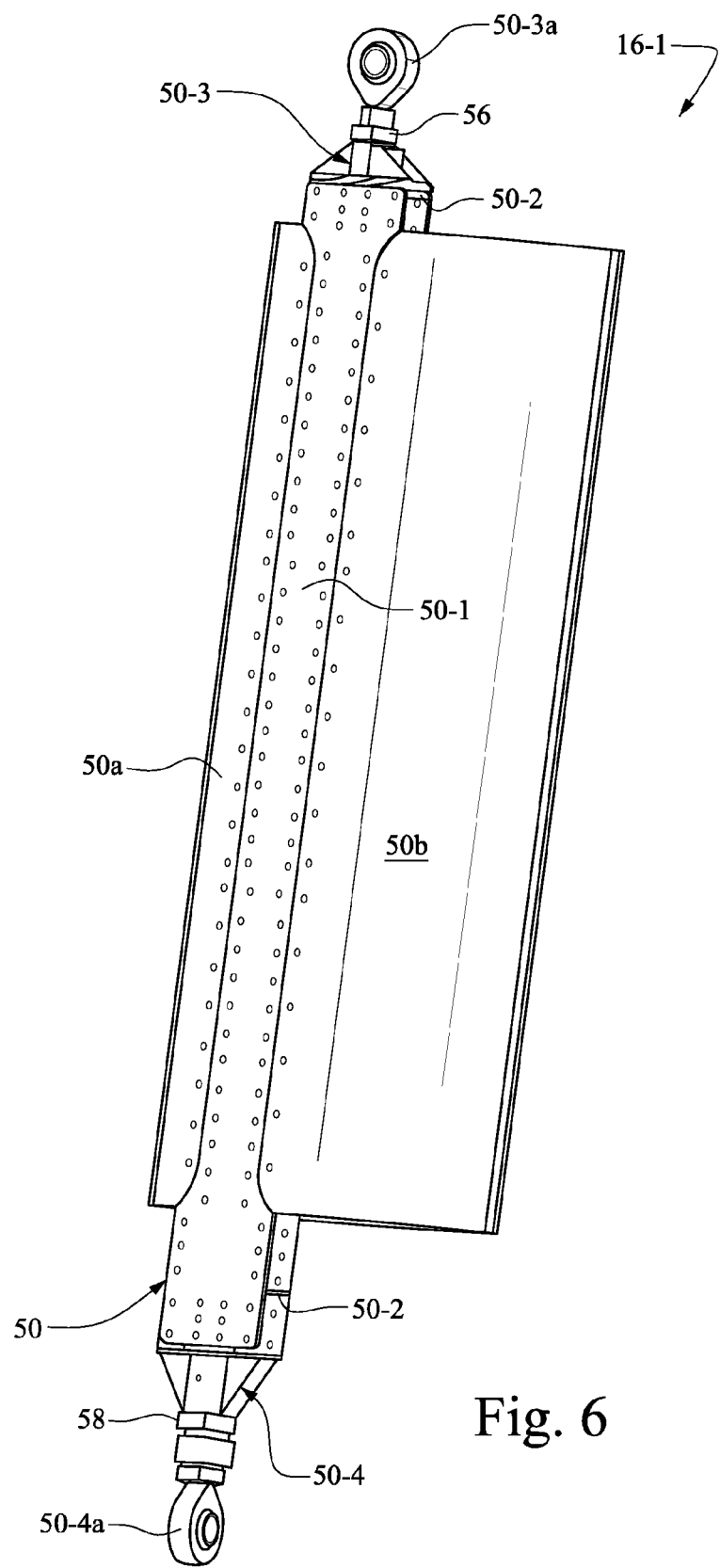
FIG. 6 is a perspective view of a representative aft pylon spar assembly associated with the aft pylon structures depicted in FIG. 5.
Figure 7:
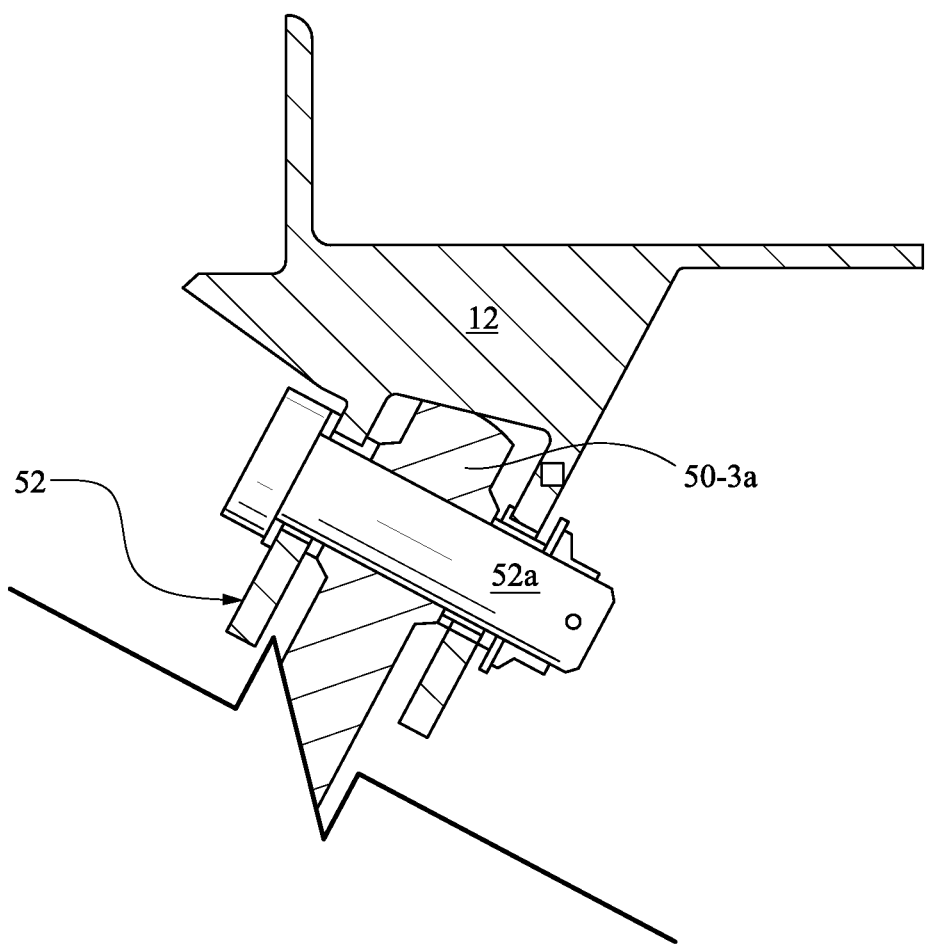
FIG. 7 is an enlarged cross-sectional view of an upper attachment lug assembly associated with the aft pylon structures.
Figure 8:
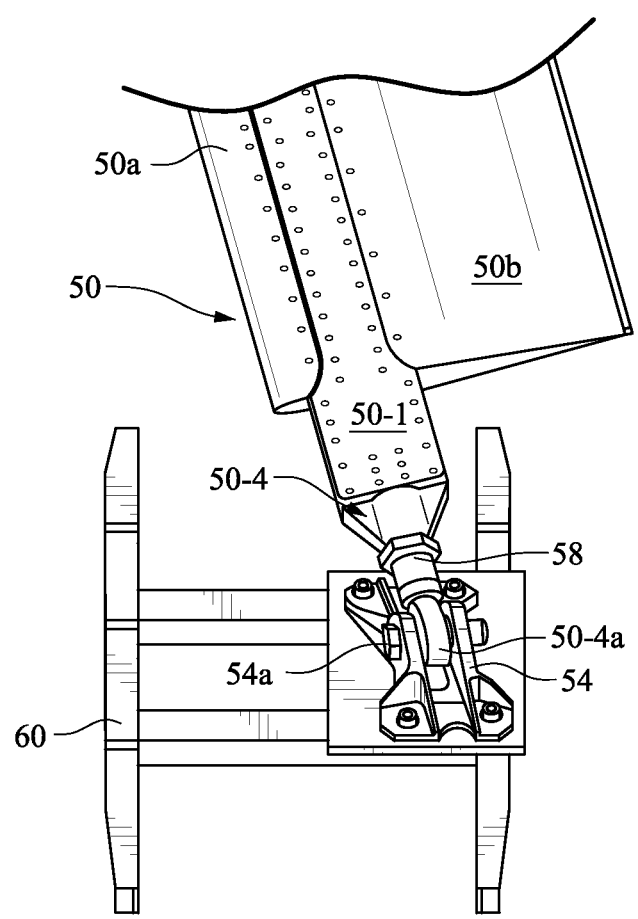
FIG. 8 is an enlarged side perspective view of a lower attachment lug assembly associated with the aft pylon structures.
Figure 9:
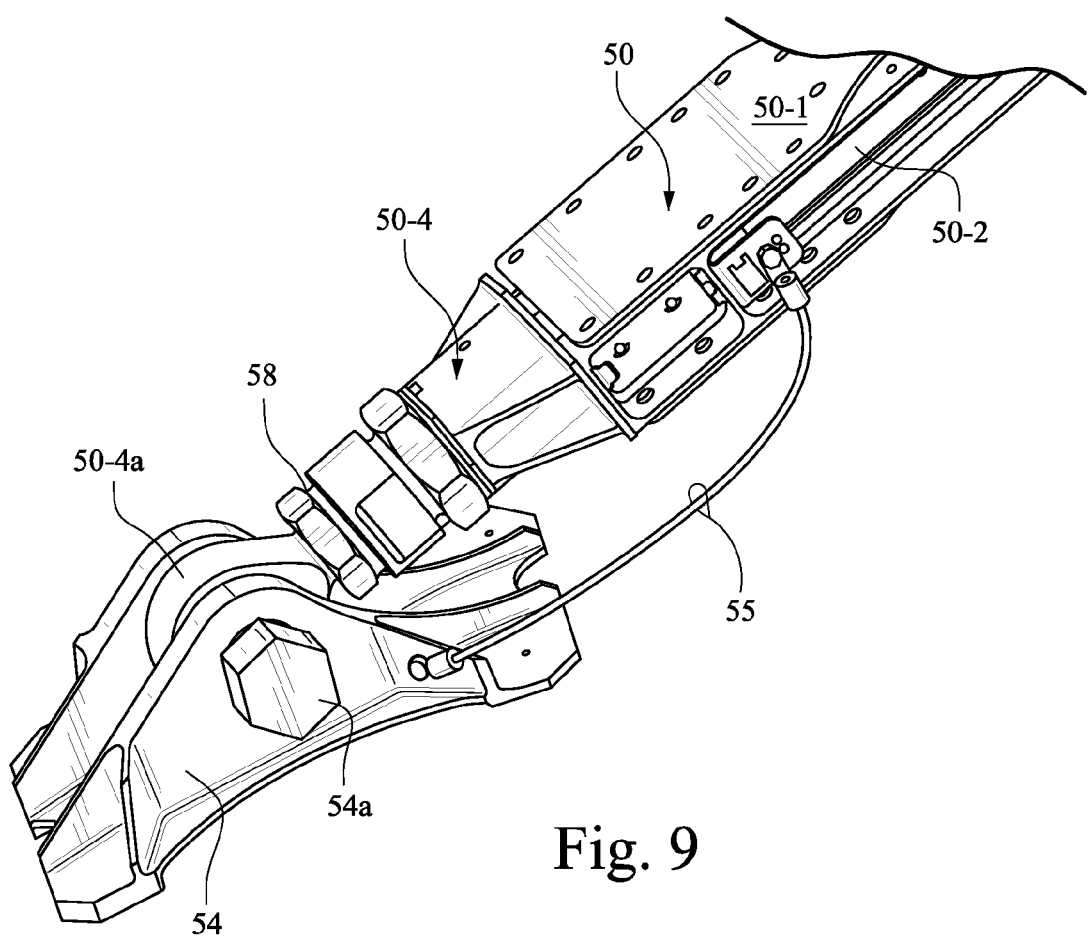
FIG. 9 is an enlarged rear perspective view of the lower attachment lug assembly depicted in FIG. 8.

The port lug mount 14-4a is depicted in greater detail in accompanying FIGS. 3 and 4, it being understood that the starboard lug mount 14-4b is a mirror image structure thereof. Thus, a description of the structures associated with the port lug mount 14-4a is similarly applicable to the structures associated with the starboard lug mount 14-4b.

As can be seen in FIGS. 3 and 4, the port lug mount 14-4a includes an integrated structural component formed of a generally U-shaped channel member 20 and a pair of lateral fitting members 22 and 24, respectively. The members 20, 22 and 24 collectively a pair of coaxially aligned apertures 26, 28 which receive a fail safe pin 30. The pin 30 is also connected to the flange assembly 18a-1 of the port mounting rail 18a associated with the sensor pod 12. In such a manner, therefore, the mounting rail 18a, and hence the sensor pod 12, may be rigidly attached to the port pylon structure 14-1 via the lug mount 14-4a.

The forward pylon assembly 14 may also be provided with suitable upper and lower fairings 32a, 32b, respectively, (see FIG. 1) formed of a composite material (e.g., carbon fiber reinforced plastic material) which may be laminated to and/or sandwiched with a core formed of a flame resistant meta aramid material (e.g., NOMEX® polymer).

The aft pylon assembly 16 is shown in greater detail by accompanying FIGS. 5-9. In this regard, it will be observed that the aft pylon assembly 16 also includes mirror image port and starboard aft pylon structures 16-1, 16-2, respectively. The upper and lower ends of these pylon structures 16-1, 16-2 may be provided with suitable upper and lower fairings 34a, 34b in a manner similar to those provided with the fore pylon structures 14-1, 14-2 so as to improve the aerodynamic of the pylon structures.

As can be seen, each of the port and starboard aft pylon structures 16-1 16-2 are provided with a pylon strut assembly 50, 51 and forward and aftward airfoils 50a, 50b and 51a, 51b, extending forwarding and rearwardly (relative to the aircraft) from the strut assembly 50, 51, respectively.

The port aft pylon structure 16-1 is depicted in greater detail in accompanying FIGS. 6-9, it being understood that the starboard aft pylon structure 16-2 is a mirror image structure thereof. Thus, a description of the structures associated with the port aft pylon structure 16-1 is similarly applicable to the structures associated with the starboard aft pylon structure 16-2.

As can be seen, the port side aft pylon strut 50 includes an elongate spar 50-1 which may be machined from suitable aircraft aluminum alloys to form an I-beam cross-sectional structure. The spars may also be connected to generally C-shaped ribs 50-2 for structural enhancement. The spar 50-1 is connected to upper and lower attachment fittings 50-3, 50-4 for connecting the spar 50-1 to the sensor pod 12 and the aircraft fuselage F, respectively.

The upper and lower attachment fittings 50-3, 50-4 include respective eye-bolt rod connectors 50-3a, 50-4a which are threadably received within the attachment fittings 50-3, 50-4, respectively. The connectors 50-3a, 50-4a are thus aligned with apertures associated with pod attachment lug 52 and the fuselage attachment lug 54 and secured tot the same by a connection pin 52a, 54a, respectively (see FIGS. 7 and 9, for example). The fuselage attachment lug 54 is connected rigidly to underlying fuselage structural components 60 (see FIG. 8). An electrically conductive strap 55 is provided so as to electrically bond (ground) the structures of the aft pylon strut 50 to the fuselage attachment lug 54, and hence to the aircraft's fuselage support structure 60.

The upper and lower attachment fittings 50-3, 50-4 also include adjustment nuts 56, 58, respectively, threaded to the shank of the eye-bolt rod connectors 50-3a, 50-4a, respectively. The adjustment nuts 56, 58 therefore positionally lock the respective eye-bolt rod connectors 50-3a, 50-4a to the fittings 50-3, 50-4. The adjustment nuts 56, 58 may however be loosened to allow the respective eye-bolt rod connectors 50-3a, 50-4a to be threadably turned relative to the fittings 50-3, 50-4 to thereby in turn permit the effective length of the spar 50-1 to be adjustably changed. Thus, turning movement applied to the eye-bolt rod connectors 50-3a, 50-4a relative to the fittings 50-3, 50-4, respectively, will thereby responsively allow for lengthwise adjustment of the port side aft pylon strut 50. In such a manner, therefore, the aft pylon assembly 16 may be size-adjusted to fit a variety of airborne sensor pods 12.

While the fore and aft pairs of pylon assemblies 14, 16, respectively, have been shown and described herein as having the fore pylon assembly 14 being non-adjustably fixed the aft pylon assembly 16 being adjustably fixed between the sensor pod 12 and the aircraft fuselage AF, it will be appreciated that other embodiments may be reversed. Thus, it is contemplated that embodiments of the invention could include lengthwise adjustable fore pylon assemblies and non-adjustable aft pylon assemblies.

Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope thereof.

What is claimed is:

1. A sensor pod attachment assembly for attaching a sensor pod containing airborne sensor equipment to an aircraft fuselage, the attachment assembly comprising:
    fore and aft pairs of attachment pylon assemblies each having a lower end attached to the aircraft fuselage and an upper end attached to the sensor pod, wherein
    the fore pair of attachment pylon assemblies includes port and starboard pylon structures, and a cross-support base connected to upper ends of the port and starboard pylon structures, and wherein
    each of the port and starboard pylon structures includes (i) elongate fore and aft upright spars having lower ends for attachment to the aircraft fuselage and upper ends connected to the cross-support base, and (ii) ribs and stringers connecting the fore and aft upright spars to one another, and wherein
    the cross-support base includes port and starboard lug mounts positioned above an upper end of the port and starboard pylon structures, respectively, for attaching the sensor pod to the fore pair of attachment pylon assemblies.

2. An aircraft which comprises the sensor pod attachment assembly as in claim 1.

3. The sensor pod attachment assembly as in claim 2, wherein each of the upper and lower connector rods are threadably connected to the upper and lower attachment fittings, respectively.

4. The sensor pod attachment assembly as in claim 3, wherein the upper and lower connector rods are eye-bolt rod connectors.

5. The sensor pod attachment assembly as in claim 2, wherein the lengthwise adjustable spar assembly further includes an adjustment nut threadably connected to the at least connector rod for positionally locking the at least one connector rod.

6. The sensor pod attachment assembly as in claim 3, wherein the lengthwise adjustable spar assembly further includes upper and lower adjustment nuts associated with the upper and lower connector rods for positionally locking the upper and lower connector rods relative to the upper and lower attachment fittings, respectively.

7. The sensor pod attachment assembly as in claim 2, wherein the at least one attachment pylon further comprises pod and fuselage attachment lugs for respectively attaching the upper and lower connector rods to the sensor pod and aircraft fuselage, respectively.

8. The sensor pod attachment assembly as in claim 7, wherein the fuselage attachment lug comprises a U-shaped channel member defining a coaxially aligned pair of apertures, wherein the lower connector rod is an eye-bolt connector rod aligned with the apertures of the channel member, and wherein the assembly comprises a connector pin inserted through the apertures and the connector rod to attach the connector rod to the U-shaped channel member.

9. The sensor pod attachment assembly as in claim 8, wherein the fuselage attachment lug comprises a pair of lateral fitting members connected to the U-shaped channel member.

10. The sensor pod attachment assembly as in claim 1, wherein the fore and aft pairs of attachment pylons each include forward and rearward airfoils extending forwardly and rearwardly therefrom relative to the aircraft fuselage.

11. An aircraft which comprises the sensor pod attachment assembly as in claim 1.

* * * * *